(No Model.)
S. M. ALEXANDER.
COMBINED GARDEN TOOL.
No. 508,393. Patented Nov. 14, 1893.
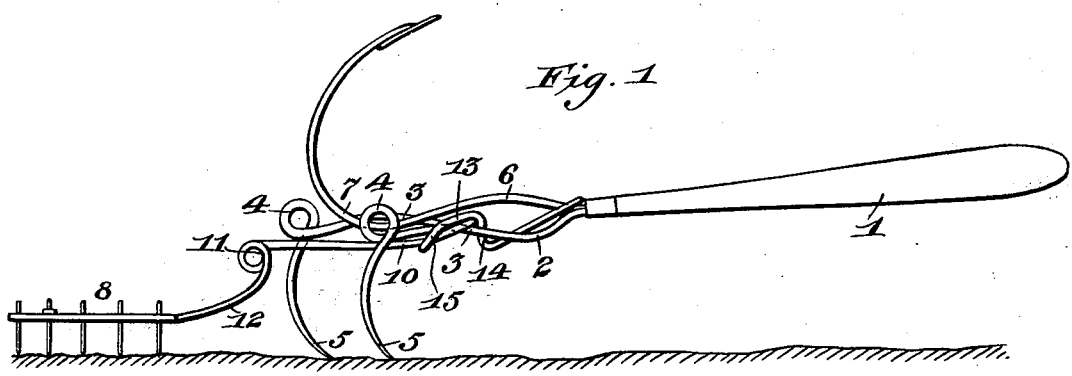
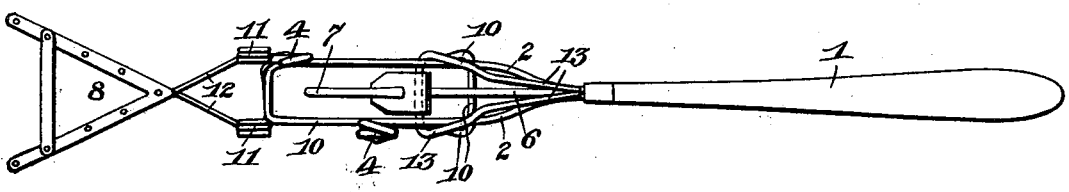
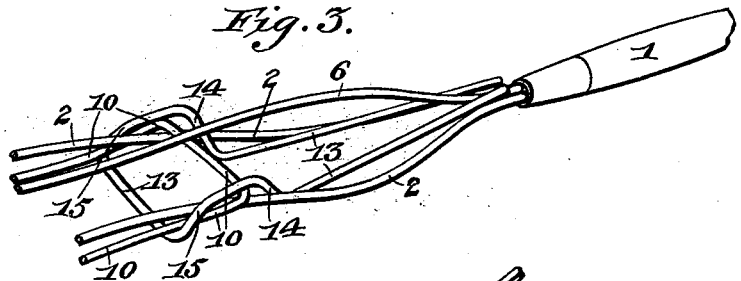
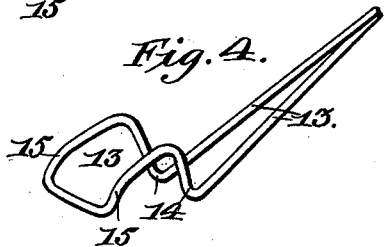
Witnesses
Severance
W. Harvey Muzzy
Inventor
Samuel M. Alexander,
By J. B. Lawyer
Attorney

UNITED STATES PATENT OFFICE.

SAMUEL M. ALEXANDER, OF BENTONVILLE, ARKANSAS.

COMBINED GARDEN-TOOL.

SPECIFICATION forming part of Letters Patent No. 508,393, dated November 14, 1893.

Application filed September 5, 1893. Serial No. 484,818. (No model.)

*To all whom it may concern:*

Be it known that I, SAMUEL M. ALEXANDER, a citizen of the United States, residing at Bentonville, in the county of Benton and State of Arkansas, have invented certain new and useful Improvements in Combined Garden-Tools; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has for its object to produce a garden tool in which is combined a cultivator, a hoe, and a pulverizer or harrow, the last named implement being capable of being removed from, or secured to the two first named implements, as the case may require, all of the implements being secured to a single handle, by which they may be operated by hand, and for this purpose it consists in the construction, arrangement and combination of the several parts of which it is composed, as will be hereinafter more fully described and claimed.

Referring to the accompanying drawings in which corresponding parts are designated by similar marks of reference: Figure 1 is a side elevation of an implement constructed in accordance with this invention. Fig. 2 is a plan view thereof. Fig. 3 is a detail perspective view of the clutch and parts in engagement therewith. Fig. 4 is a detail view of the clutch detached.

The handle 1 has secured therein in any proper manner the spring arms 2, which are brought down and bent upwardly, as at 3, the said arms, which are of different length, each being coiled at 4, and formed into blades 5, the object of which is to break up the soil when the tool is drawn therethrough by the handle, the clogging of the blades being prevented by the one being in the rear of the other. A secondary spring arm 6 is also inserted in the handle, or it may be secured to the spring arms 2, for which purpose the latter are brought together before their insertion into the handle. In any case, the secondary spring arm 6 is centrally located above the spring arms 2, and is carried upwardly therefrom and bent downwardly as at 7, from which point it again curves upwardly, and has upon its extreme end a hoe blade, which may be used for any desired purpose when the pulverizer or harrow is not attached to the handle, or it may be even used when the harrow is attached.

The harrow 8 consists of a suitable frame having teeth inserted therein, and projecting below the lower surface thereof, and is attached to the handle 1 in the following manner: A loop 10 is provided, the rear end of which is adapted to be contained between the cultivator blades 5, while the forward end thereof passes over the spring arms 2, the rear end of the loop having coils 11 thereon, which are connected by draft rods 12 with the forward end of the harrow. The clutch 13 consists of a single piece of spring metal, having its two ends brought together, and normally over-lapping (see Fig. 4) while its central portion is widened out sufficiently to permit its insertion under the forward end of the loop 10 and the spring arms 2. From this widened portion the ends are bent inwardly, as has been stated, and have shoulders 14, projecting downwardly formed therein, the said shoulders being adapted to be contained between the spring arms 2 and in front of the front end of the loop 10, they being held down by the frictional resistance between the ends of the clutch and the secondary spring arm 6, which latter is inserted between the former. As will be noticed from the drawings, the clutch is bent suddenly down, as at 15, immediately in the front of its widest portion, and in the rear of the shoulders 14, in order that its widened portion may be below the loop 10, as near the front end thereof as possible. By this means the front end of the loop is securely fastened to the spring arms 2, and thus to the handle 1, while the rear end of the loop is held against a lateral movement, by being contained between the cultivator blades, and is limited in its upward movement by being under the coils 4 on the spring arms 2. It will thus be seen that in using my combined tools, when the harrow is attached thereto, the cultivator blades, on being drawn through the earth, will loosen it, while the harrow following immediately in the rear thereof, will pulverize the earth so loosened, the coils 11, giving the desired spring pressure on the harrow, to permit it to pass over obstacles, and at the same time causing it to enter the ground to a sufficient depth.

Having thus described my invention, what I claim is—

1. The combination in a garden tool, of spring arms 2, having coils therein, and having cultivator blades upon their ends, a secondary spring arm 6, having a hoe blade thereon, oppositely disposed in relation to the said cultivator blades, and a handle to which the said arms are secured, substantially as described.

2. The combination in a garden tool, of a handle, spring arms 2 secured thereto, and having cultivator blades upon their ends, a harrow, and a detachable spring connection between the said spring arms and the harrow, substantially as described.

3. The combination in a garden tool, of a handle, spring arms 2 secured thereto, and having cultivator blades upon their ends, a harrow, a loop adapted to be inserted over the said spring arms and connected with the said harrow, and a clutch securing the said loop and the spring arms together, substantially as described.

4. The combination in a garden tool, of a handle, spring arms 2 secured thereto, and having cultivator blades upon their ends, a harrow, a loop adapted to be inserted above the said spring arms, a spring connection between the said loop and harrow, and a spring clutch engaging the said loop and spring arms, substantially as described.

5. The combination in a garden tool, of a handle, spring arms 2 secured thereto, and having coils therein, and having cultivator blades upon its ends, a secondary spring arm 6 having a hoe blade thereon oppositely and centrally located in relation to the said cultivator blades, a harrow, a loop having its front end adapted to be inserted over the first named spring blades and its rear end to pass between the said cultivator blades, a spring connection between the said loop and harrow, and a clutch formed of spring metal, and having its ends brought together, its central portion being widened to pass beneath and upon the outside of the said loop and first named spring arm, and having shoulders in the front of said widened portion, adapted to pass between the first named spring arms and in front of the forward end of the loop, the ends of the said clutch bearing upon and lying on each side of the secondary spring arms, substantially as described.

In testimony whereof I affix my signature in presence of two witnesses.

SAMUEL M. ALEXANDER.

Witnesses:
JAMES H. SWEANY,
J. S. BLACK.